INVENTORS:
JAMES ELLIOTT WILSON
SAMUEL McCONNELL
& CAMPBELL BROWN
By John C Brady
Attorney

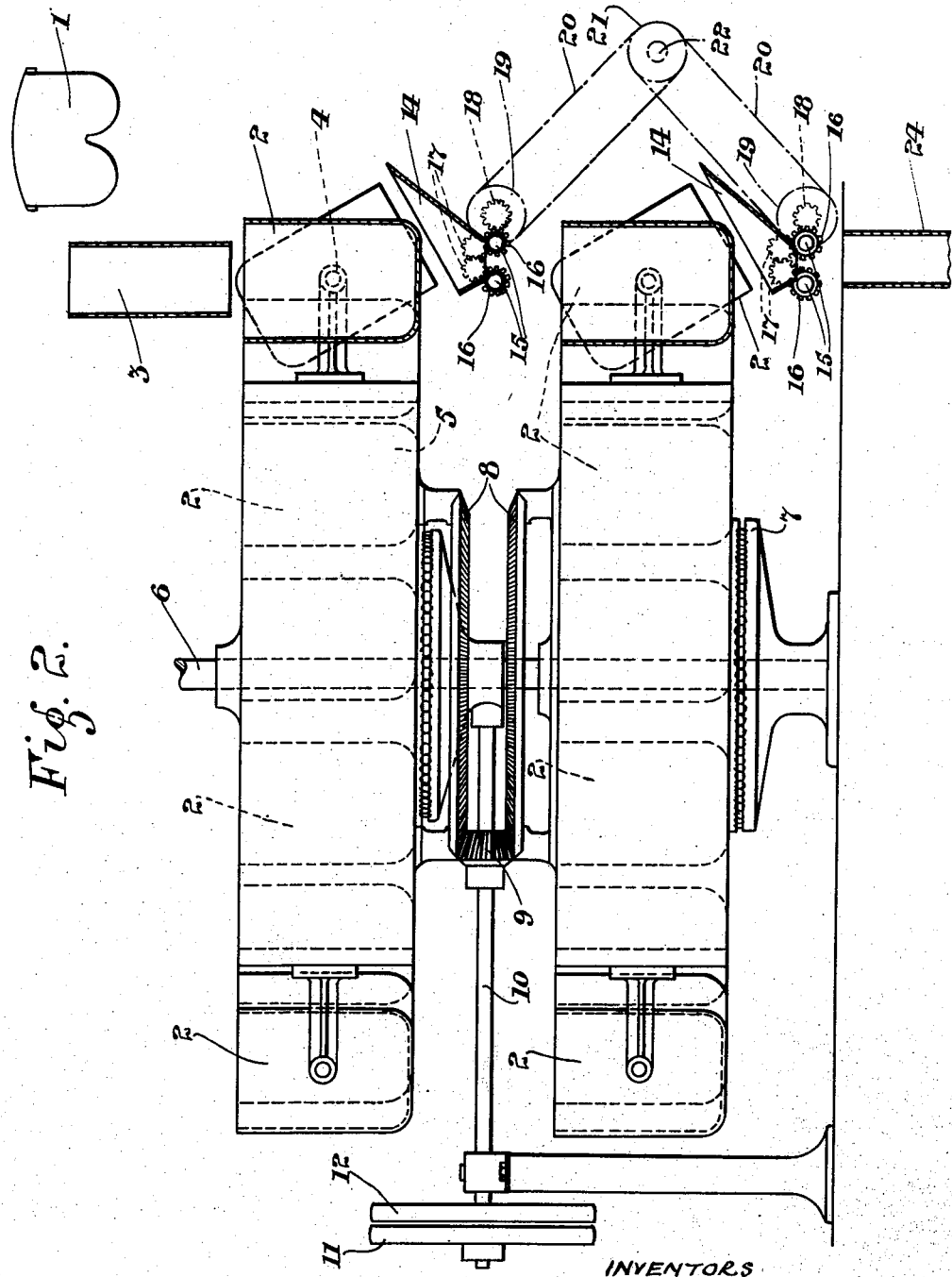

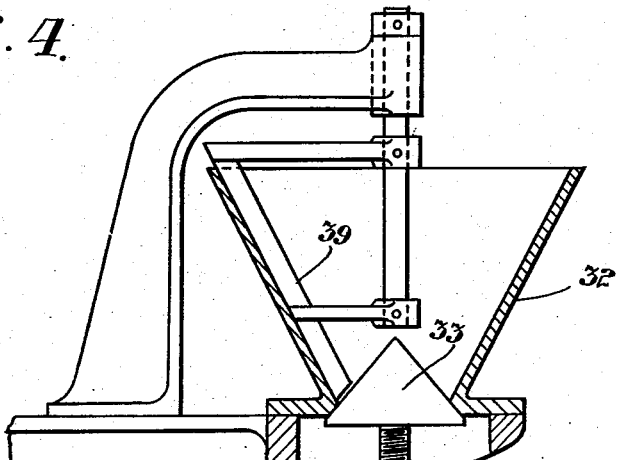
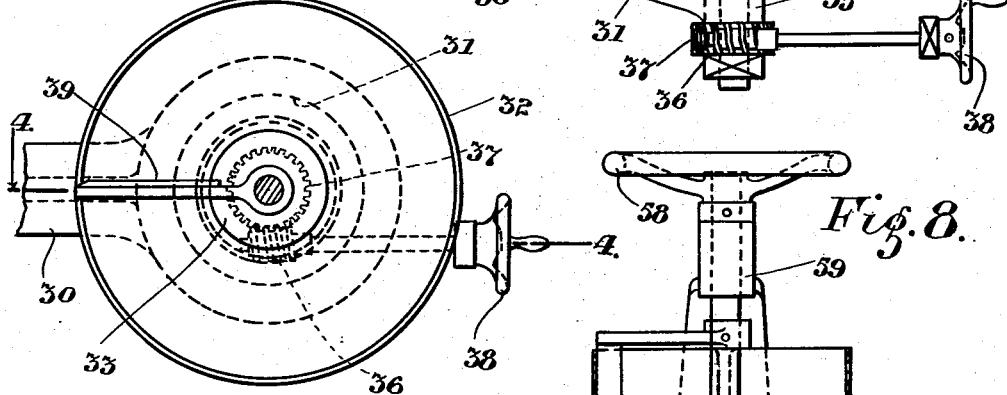
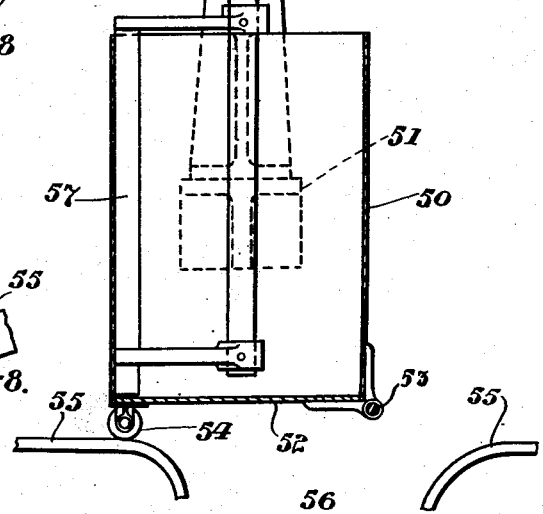
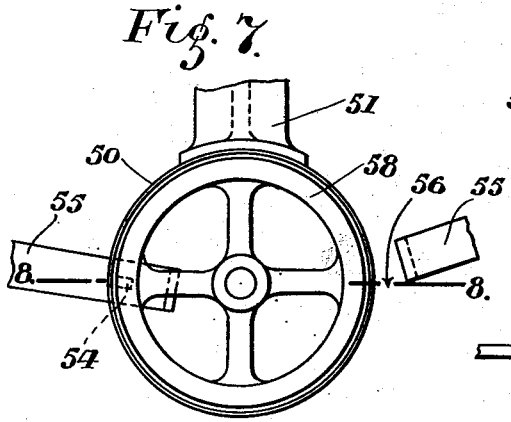

Jan. 19, 1926. 1,570,365
J. E. WILSON ET AL
PREPARATION OF DOUGH FOR THE MAKING OF BREAD
Filed March 20, 1925 4 Sheets-Sheet 4
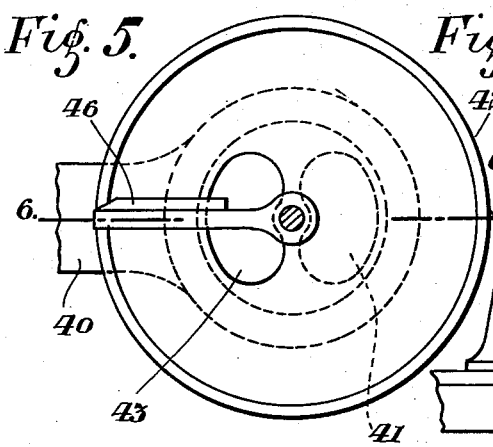
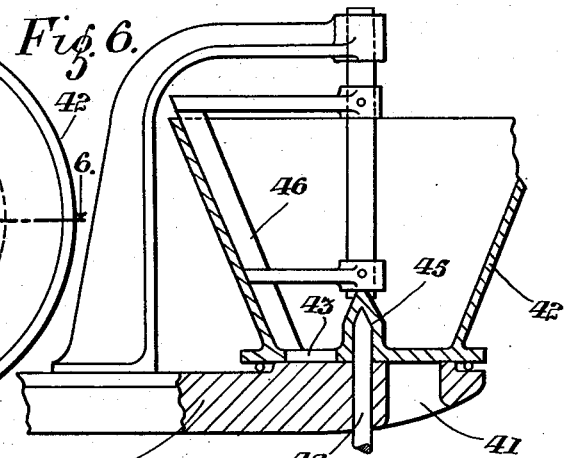
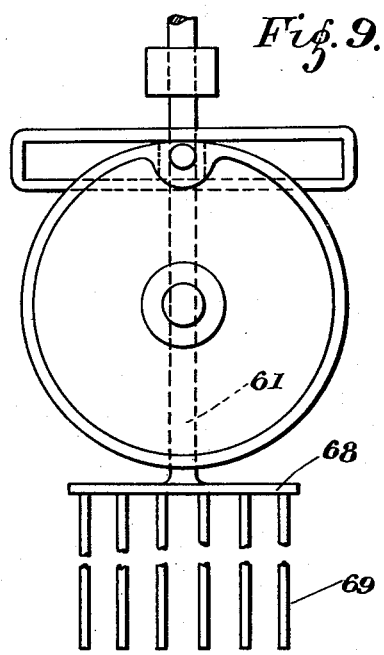
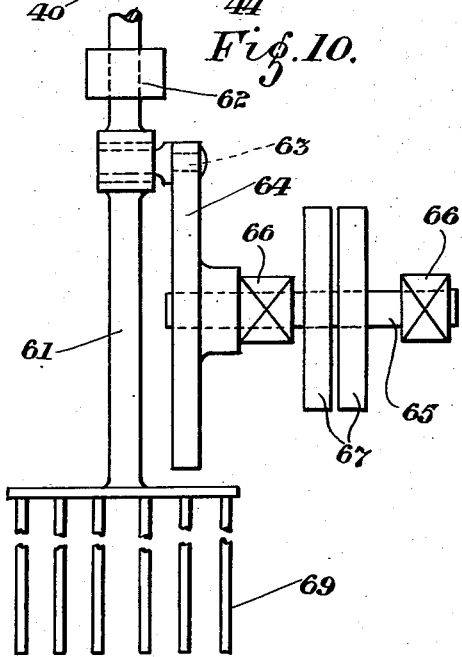
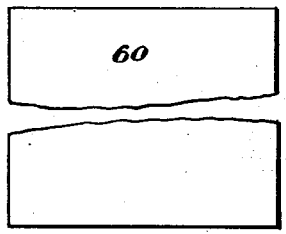
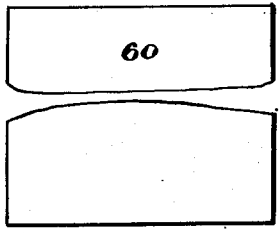
INVENTORS:
JAMES ELLIOTT WILSON
SAMUEL McCONNELL
& CAMPBELL BROWN
By John B. Brady
attorney Patented Jan. 19, 1926.

1,570,365

UNITED STATES PATENT OFFICE.

JAMES ELLIOTT WILSON, SAMUEL McCONNELL, AND CAMPBELL BROWN, OF BELFAST, IRELAND.

PREPARATION OF DOUGH FOR THE MAKING OF BREAD.

Application filed March 20, 1925. Serial No. 17,034.

*To all whom it may concern:*

Be it known that we, JAMES ELLIOTT WILSON and SAMUEL McCONNELL, both of Belfast, Ireland, and CAMPBELL BROWN, of Belfast, Ireland, all subjects of the King of Great Britain and Ireland, have invented certain new and useful Improvements Relating to the Preparation of Dough for the Making of Bread, of which the following is a specification.

This invention relates to the preparation of dough which is used in the making of bread and has for its object to provide improvements in the means for dealing with or treating the dough during the period of fermentation and while it is being passed from the dough making machine to the bread making plant.

According to this invention a plurality of sets of superposed troughs or receptacles (hereinafter referred to as troughs) are provided each set comprising a series of troughs, each of the troughs of one series being successively moved into a position to receive a portion of dough from a feeding appliance and carrying it while it is fermenting or proving and subsequently to discharge it into a trough of the other series and means for braking the successive charges of dough either on discharge from one series of troughs or while it is in the troughs intermediate the feeding and discharge thereof.

In order that the invention may be clearly understood and more readily carried into practice we have appended hereunto four sheets of drawings illustrating the same, wherein:—

Fig. 2 is a sectional elevation on line 2—2 in Fig. 1.

Fig. 3 is a plan view of a modified form of trough.

Fig. 4 is a sectional elevation on line 4—4 in Fig. 3.

Fig. 5 is a plan view of a further modified form of trough.

Fig. 6 is a sectional elevation on line 6—6 in Fig. 5.

Fig. 7 is a plan view illustrating a further modified form of trough.

Fig. 8 is a sectional elevation on line 8—8 in Fig. 7.

Fig. 9 is a front elevation of a device for effecting the "cutting back" or braking of the dough.

Fig. 10 is a side elevation thereof.

Figure 1:
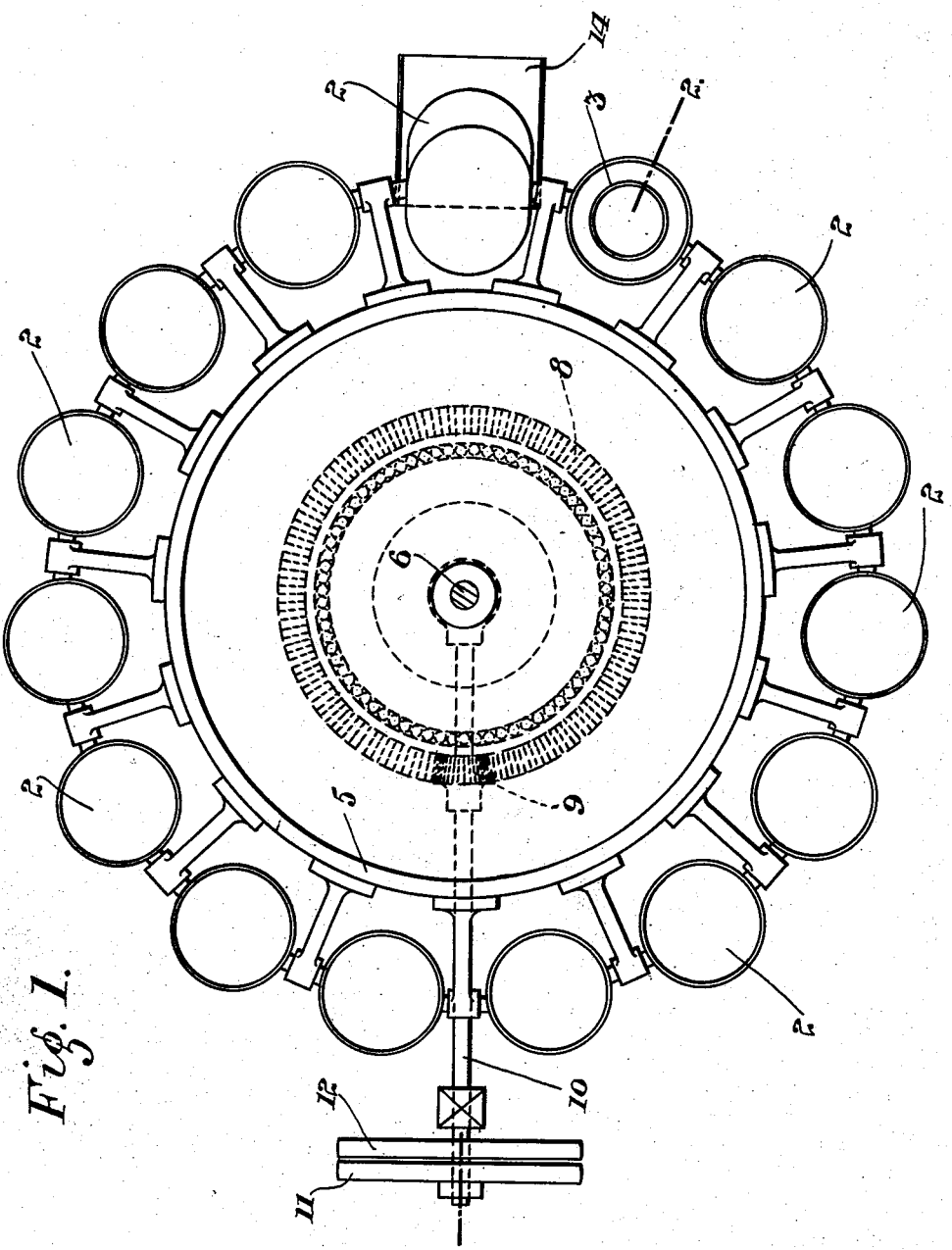
Fig. 1 is a plan view of the apparatus according to this invention.

In the construction illustrated at Figs. 1 and 2 the dough, or dough mixture is prepared in the mixer and/or kneader indicated at 1 and is charged directly into troughs 2 through a suitable chute 3. The troughs are mounted by trunnions 4 on a carrying device which is in the form of a circular structure 5 disposed horizontally and mounted to rotate on a vertical shaft 6. This structure is supported on a ball race 7 and is driven by a bevel wheel 8 fixed thereto, meshing with a bevel pinion 9 on a shaft 10 having fast and loose pulleys 11 and 12 by which it is connected by belt gearing with a suitable prime mover. The troughs are arranged around the periphery of the structure and adapted to be brought one by one in succession below the chute, or into a suitable position relatively to the mixer in order to receive the dough, or dough mixture therefrom. Each trough when filled, or filled to the desired extent is passed round, and another brought into filling position. These troughs are tiltably supported so that they can be substantially inverted, as indicated in dotted lines in Fig. 1, for the purpose of discharging their contents. These troughs before being brought to a discharging position, are preferably, caused to travel round in a circular path, this movement being obtained by the rotation of the carrying device and the time occupied in this movement is used for proving or fermentation purposes. When brought to the discharging position the troughs precipitate their contents into a chute 14 having pressing rollers 15 arranged at the bottom thereof. These rollers are rotated by the gearing 16 and 17 from a suitable source to be hereinafter described. The action of these rollers is to brake the dough automatically and uniformly and from these rollers, or equivalent, the dough is preferably transferred to a second series of troughs similar to and mounted to operate in like manner to the first series already described and these second series of troughs are arranged co-axially with and below the first series and are driven from the same source so as to turn in an opposite direction to that of the first series.

In this construction the discharge position is that immediately preceding the filling position as regards the first series of troughs and also as regards the second series of troughs.

Alternatively if desired the second series of troughs whilst supported on a turning structure in the same manner as the first series, may be so arranged that the axis of the second series is so positioned as to be parallel with the axis of the first series and so as to cause the troughs of the first series to be brought tangentially above the troughs of the second series, or otherwise into a suitable position for discharging into the latter. In this latter case the second series of troughs could be arranged to rotate in the same direction as the first series, or in the reverse direction if desired. The troughs of the second series when brought to the discharging position are preferably adapted to discharge into a chute having pressure rollers 15, and arranged to act on the dough in a similar manner to the rollers at the bottom of the chute between the first and second series of troughs. The rollers 15 are driven through the gear wheels 16 and 17 from a pinion 18 which meshes with one of the wheels 16 and is driven by means of a pulley 19 and belt 20 from a pulley 21 on a suitably driven shaft 22.

The dough in passing the second series of pressing rollers is discharged into a chute 24 from which it goes directly to the dividing hopper.

The pressing rollers, as described, may be arranged to be adjustable to control the passage of the dough, or dough mixture in accordance with the requirements, and this may also be effected, if desired, by controlling the discharge opening from the chute to the rollers.

It will be understood that although we have described the use of rollers for the braking of the dough these means might, for example, take the form of bands, or plates of suitable shape and having suitable adjustment means if required.

The trough carrying structure as hereinbefore described may be arranged as a horizontal structure rotating about a vertical axis or it may be arranged to rotate about a horizontal axis, or in place of the structure as described we may suspend the troughs on chain, or equivalent, moving in a suitable path. The rotation, or turning, or other movement of the means carrying the troughs may be effected by hand, or power, and may be continuous or intermittent and the time occupied by the dough in passing from the mixing point to the discharge into the hopper of the divider would be arranged to give the necessary time for proving or fermentation purposes.

While we have described two series of troughs it should be understood that in some cases more than two series of troughs may be required working according to the arrangement hereinbefore described, with chutes and rollers, or equivalent and (or) kneaders between each series if required and according to the process of manufacture adopted. The number of troughs required is determined by the required period of fermentation and the quantity of dough, or dough mixture to be handled in a given time.

In the construction shown in Figs. 3 and 4 a modified form of trough is illustrated in which the structure 30 is provided at intervals round its periphery with openings 31 above which are fixed on the structure 30 the troughs 32 of inverted truncated conical form. These troughs are arranged to discharge the contents through an opening in the bottom which is normally closed by the valve 33 of conical form which is mounted upon a screwed rod 34 disposed in a bearing 35 and operated by the worm 36 and worm wheel 37 from the operating member 38. In this case the trough is also provided with a scraper 39 which is adapted to be rotated to dislodge the material.

It will be understood that these troughs will be arranged and operated in a similar manner to the troughs described and illustrated in Figs. 1 and 2.

A further construction is shown in Figs. 5 and 6 in which the circular carrier 40 is provided with a kidney shaped opening 41 above which is rotatably mounted an inverted frusto-conical trough member 42 which is also provided with a kidney shaped opening 43 at one side. The contents are adapted to be discharged in this case by moving the two openings 43 and 41 into alignment with each other. The trough is rotatably mounted by means of the spindle 44 which engages with a recess 45 in the trough. Further, a scraper 46 is also provided in this case.

In a further modification illustrated at Figs. 7 and 8 the trough is adapted to automatically discharge its contents. In the construction illustrated the trough is of hollow cylindrical form and is mounted at the end of the arm 51 of a rotary device. The top and bottom of this trough are open and the bottom is closed by a door 52 hinged at one side 53 and is provided with a small roller 54 at the opposite side. The roller is normally in contact with a fixed frame member 55 which serves to retain the door 52 in its closed position. As the trough is rotated however, the door is brought into alignment with an opening 56 in the frame when the latter can fall by the action of gravity on its own mass and so discharge its contents. A scraper 57 is provided in this case mounted to be rotated by a hand wheel 58 mounted in a bearing 59 on the arm 51.

In Figs. 9 and 10 a modified form of appliance for effecting the braking of the dough is illustrated. In this arrangement the device acts upon the dough while it is in the trough. The trough is indicated diagrammatically at 60 and the appliance consists of a ram 61 mounted to slide in the stock 62 and reciprocated by the engagement of the projecting pin 63 on the ram with a wheel 64 mounted upon a spindle 65 and bearings 66 and provided with pulleys 67. The ram is provided at its lower end with a plate 68 having a number of downwardly projecting pins 69. This device is mounted in a suitable position in the path of the movement of the troughs and it is driven synchronously with the carrying member of the troughs so arranged that as the troughs move under the ram the ram is moved down into the trough to effect the braking of the dough.

If desired the two methods of braking the dough i. e. that shown in Figs. 1 and 2 and that shown in Figs. 9 and 10 may be both used in the same apparatus.

Having now fully described our invention what we claim and desire to secure by Letters Patent is:—

1. Means for handling dough comprising a plurality of sets of troughs for the dough; means for discharging the dough from a trough of one set into a receptacle of the other set, and means intermediate the sets of troughs for effecting braking of the dough.

2. Means for handling dough comprising a plurality of sets of troughs for the dough; means for discharging the dough from a trough of one set into a receptacle of the other set; a gravity feeding device intermediate the sets of troughs and rollers in said gravity feeding device to effect the braking of the dough.

3. Means for handling dough comprising a plurality of superposed carrying devices; troughs for the dough on said carrying devices; means for feeding the dough to the troughs; means for discharging the dough from the troughs of one carrying member into the troughs of the other carrying member; means for moving one carrying device to bring the troughs thereof successively into alignment with the feeding device; means for moving the other carrying member to bring the troughs thereof successively into a position to receive the dough discharged from the first troughs means for discharging the dough from the troughs of said other carrying member and means to effect the braking of the successive charges of the dough intermediate the feeding and discharging means.

4. Means for handling dough comprising a plurality of superposed carrying devices; troughs for the dough on said carrying devices; means for feeding the dough to the troughs; means for discharging the dough from the troughs of one carrying member into the troughs of the other carrying member; means intermediate the sets of troughs for effecting braking of the dough and means for discharging the dough from the troughs of said other carrying member.

5. Means for handling dough comprising a plurality of superposed carrying devices; troughs for the dough on said carrying devices; means for feeding the dough to the troughs; means for discharging the dough from the troughs of one carrying member into the troughs of the other carrying member; means intermediate the sets of troughs for effecting braking of the dough; means for moving one carrying device to bring the troughs thereof succesively into alignment with the feeding device; means for moving the other carrying member to bring the troughs thereof successively into a position to receive the dough discharged from the first troughs and means for discharging the dough from the troughs of said other carrying member.

In testimony whereof we affix our signatures.

JAMES ELLIOTT WILSON.
SAMUEL McCONNELL.
CAMPBELL BROWN.